Jan. 26, 1960  J. G. INGRES  2,922,499
BOOSTER BRAKE MECHANISM
Filed July 2, 1956  2 Sheets-Sheet 2
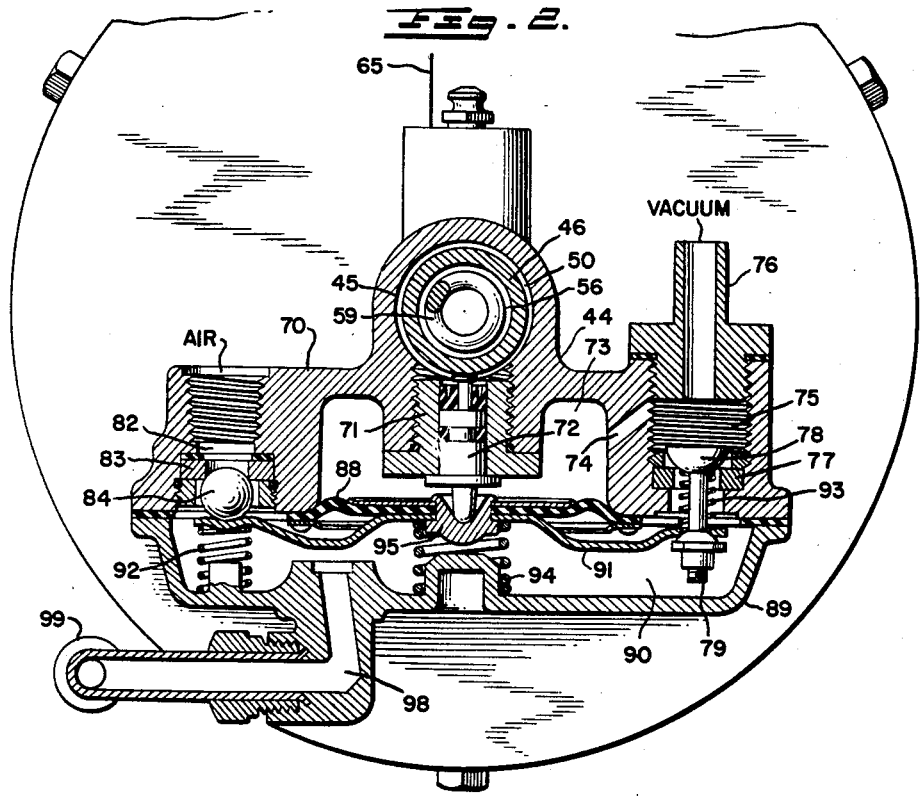
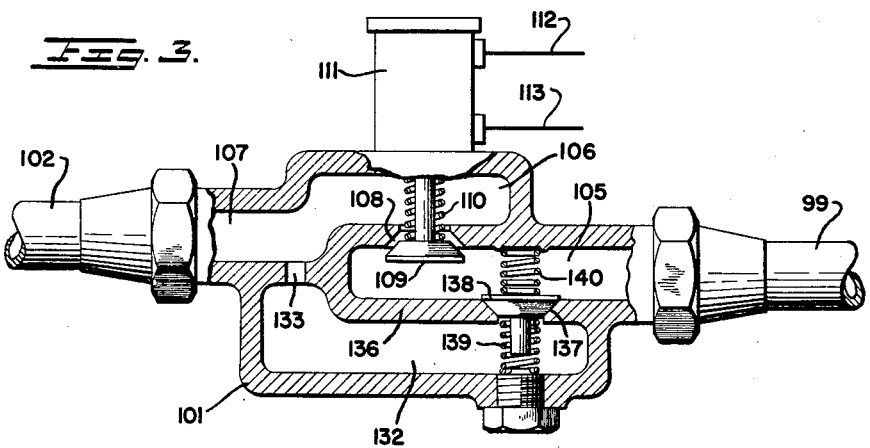
INVENTOR.
JEANNOT G. INGRES
BY
*John F. Phillips*
ATTORNEY United States Patent Office  2,922,499
Patented Jan. 26, 1960

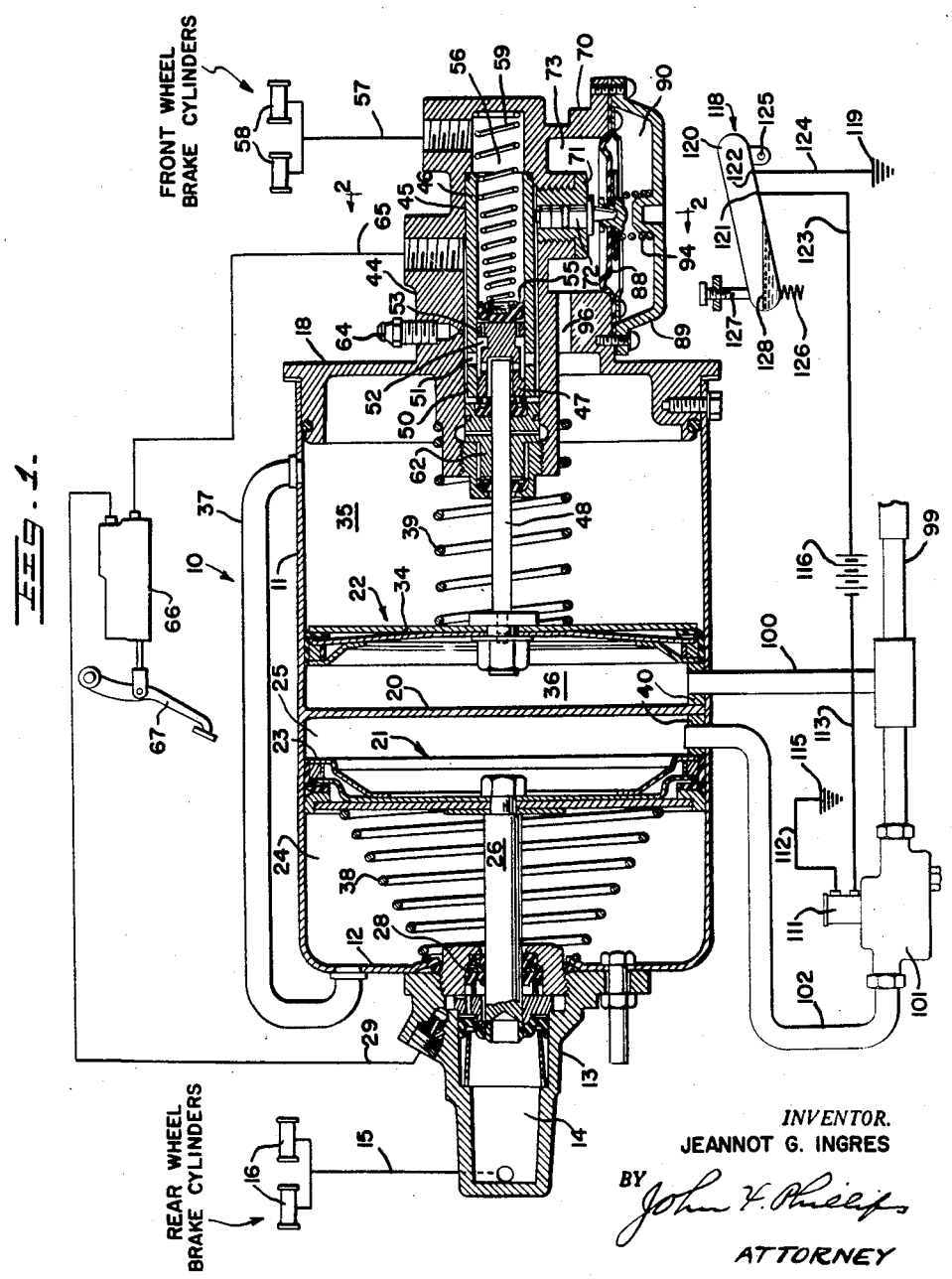

2,922,499

BOOSTER BRAKE MECHANISM

Jeannot G. Ingres, Dearborn, Mich., assignor to Kelsey-Hayes Company, a corporation of Delaware Application July 2, 1956, Serial No. 595,493

7 Claims. (Cl. 188—152)

This invention relates to a booster brake mechanism.

In the copending application of David T. Ayers, Jr., and Edward Govan Hill, Serial No. 474,804, filed December 13, 1954 there is disclosed a booster motor in the form of a cylinder divided between its ends to form separate motor units each provided with a pressure responsive unit. The apparatus is particularly intended for use on passenger cars and the booster motor unit for the rear wheels is provided with a plunger for displacing fluid from a hydraulic chamber to the rear wheel brake cylinders, and such pressure responsive unit constitutes the sole means for applying the rear brakes. The booster motor unit for the front wheel brakes has its pressure responsive unit connected to a fluid displacing plunger operable in a hydraulic chamber and connected to the front wheel brake cylinders, the last-named plunger being assisted by pedal generated pressures so that forces applied to the front wheel cylinders will be the sum of the forces generated by the associated pressure responsive unit and by the master cylinder. The fluid displaced from the master cylinder is utilized to operate a valve mechanism for controlling the motor units. These motor units are normally vacuum-suspended, and operation of the valve mechanism dumps air into each motor unit to operate the associated pressure responsive unit.

It has been found with passenger vehicles that heavier braking forces are required for the front wheels due to the greater weight of the front end of the vehicle. Therefore it is wholly feasible to apply the rear brakes solely by forces generated by the associated booster motor unit. In such case, there is a strong tendency to minimize, but not eliminate, the locking and sliding of the rear vehicle wheels when the brakes are heavily applied. To further eliminate this disadvantage, the apparatus of copending application of Edward Govan Hill Serial No. 827,193 provides an inertia-controlled switch for energizing a solenoid to close the fluid line leading to the variable pressure chamber of the rear booster motor unit. With such inertia-controlled means, deceleration of the vehicle above a predetermined rate closes the valve referred to, thus preventing the admission of additional air into the rear motor unit limiting the power generated by such motor to prevent the locking and sliding of the rear wheels. This apparatus has been found highly satisfactory and efficient in operation for a number of reasons, including the fact that it has permitted an increase of almost twenty percent in the maximum deceleration rate of passenger cars. The apparatus has a single disadvantage in that, if the brakes are subjected to a heavy application resulting in the closing of the inertia-controlled valve and then the brake pedal is suddenly fully released, there is some sluggishness in the opening of the inertia-controlled valve, thus delaying the releasing for an instant of the rear brakes.

An important object of the present invention is to provide an improvement in the structure just discussed above including the inertia-controlled valve, by providing means for overruling the inertia-controlled valve if the latter is closed and the brake pedal is suddenly released, thus eliminating any sluggishness in the releasing of the rear brakes.

A further object is to provide a booster mechanism of the type just referred to wherein an automatic bypass valve is arranged in the fluid line for the rear booster motor unit, and which bypass valve is adapted to open to release air from the rear booster motor unit independently of the inertia-controlled valve in the brief period during which such valve will remain closed or partially closed upon the sudden releasing of the brake pedal.

A further object is to provide such a mechanism having a valve device for connecting the variable pressure chamber of the rear booster motor unit to the control chamber of the valve mechanism for the flow of air from the former to the latter wholly independently of the inertia-controlled valve, thus eliminating any sluggishness in the releasing of the rear brakes.

Other objects and advantages of the invention will become apparent during the course of the following description.

In the drawings I have shown one embodiment of the invention. In this showing:

Figure 1 is a longitudinal sectional view through a booster mechanism for a vehicle braking system, other elements of the system being diagrammatically represented;

Figure 2 is an enlarged sectional view on line 2—2 of Figure 1; and

Figure 3 is an enlarged fragmentary sectional view of the improved auxiliary control valve device, parts being shown in elevation.

Referring to Figure 1, it will be noted that the booster motor mechanism itself is identical with that shown in copending application Serial No. 827,193, referred to above. A single motor unit indicated by the numeral 10 comprises a cylinder 11 closed at one end by a head 12 carrying a casing 13 forming therein a hydraulic chamber 14 connected as at 15 to the rear wheel cylinders 16. In the present embodiment of the invention, the installation is intended for use on a passenger vehicle, although it will become apparent that the apparatus may be used on trucks, in which case some variation in the system may be made. The opposite end of the cylinder 11 is closed by a preferably die-cast head 18.

The cylinder 11 is divided intermediate its ends by a wall 20, and on opposite sides of such wall, the cylinder is provided therein with pressure responsive units indicated as a whole respectively by the numerals 21 and 22. The pressure responsive unit 21 comprises a piston 23 dividing the corresponding end of the cylinder 11 to form a constant pressure chamber 24 and a variable pressure chamber 25. A piston rod 26 is connected at one end to the piston 23 and projects through suitable sealing and bearing means 28 for movement into the chamber 14 to displace fluid therefrom. Fluid in the chamber 14 is replenished through a line 29, which line and its associated elements form no part of the present invention.

The pressure responsive unit 22 comprises a piston 34 dividing the corresponding end of the cylinder 11 to form a constant pressure chamber 35 and a variable pressure chamber 36, the former of which is connected to the chamber 24 through a jumper line 37.

The two pistons 23 and 34 are respectively urged to their normal off positions shown in Figure 1 by return springs 38 and 39, and such movement of the pistons is limited by spacer members 40 the function of which will become apparent below.

The motor head 18 is preferably formed integral with a die-cast body 44 having a bore 45 therein receiving a sleeve 46 in which is slidable a plunger 47 engageable by a piston rod 48 connected at its remote end to the piston 34. The left-hand end of the bore 45 as viewed in Figure 1 is enlarged to form a chamber 50 communicating through ports 51 with an annular space 52 formed around the plunger 47. The right-hand end of the plunger 47 is apertured as at 53 for the escape of fluid to the right in Figure 1 from the space 52 past a sealing cup 55 into a chamber 56 formed partly within the sleeve 46 and communicating as at 57 with the front wheel brake cylinders 58. A return spring 59 in the chamber 56 biases the plunger 47 to its normal off position shown in Figure 1.

The piston rod 48 projects through suitable bearing and sealing means 62 in the adjacent end of the body 44, and it will be apparent that the inner end of such means forms the inner limit of the chamber formed by the space 50, the left-hand end of the piston 47 being subject to pressure in such space, as will become more apparent below.

The space 50 is provided with a conventional bleed plug 64 forming no part of the present invention. The space 50 also communicates with one end of a line 65 leading to a conventional master cylinder 66 operable by a pedal 67. The line 29 may be connected to the conventional reservoir (not shown) of the master cylinder 66, as will be obvious.

Fluid displaced from the master cylinder into the space 50 is utilized for operating a valve mechanism, forming no part of the present invention, for controlling pressures in the chambers 25 and 36. Referring to Figure 2, the body 44 is provided with an annular enlargement 70 having its axis transverse to the axis of the sleeve 46. Into the bottom of the enlargement 70 is threaded a plug 71 forming a cylinder communicating at its upper end with the space or chamber 50. A valve controlling plunger 72 is arranged in the plug 71 and is subject to downward movement upon an increase in pressure in the chamber 50. Within the enlargement 70 is formed a vacuum chamber 73 communicating through a duct 74 with a chamber 75 communicating through a nipple 76 with a suitable source of vacuum (not shown). A valve seat 77 in the bottom of the chamber 75 is engageable by a valve 78 carried by a depending stem 79.

Diametrically opposite the chamber 75, the enlargement 70 is provided with an air inlet 82 in which is arranged a valve seat 83 normally engaged by a ball valve 84.

The bottom of the chamber 73 is closed by an elastic diaphragm 88. The diaphragm 88 forms with a lower cap 89 a control chamber 90 in which is arranged a lever 91 connected at one end to the stem 79 and having its other end engaging the ball valve 84, the latter end of the lever being urged upwardly by a spring 92. The valve 78 is urged upwardly relative to the lever 91 by a spring 93, and a central spring 94 urges the center of the lever 91 upwardly. A thimble 95 secures the diaphragm 88 and lever 91 to each other and engages the lower end of the plunger 72.

The chamber 73 (Figure 1) is in constant communication with the motor chamber 35 through a duct 96. A duct 98 communicates at one end with the control chamber 90 and at its opposite end with a duct 99 (Figures 1, 2 and 3). This duct is provided with a branch 100 (Figure 1) directly communicating with the variable pressure chamber 36 through one of the spacers 40. The duct 99 continues past the branch 100 for connection with one end of a valve body 101, and this body is provided with an outlet referred to below, communicating through a pipe 102 with the motor chamber 25 through the adjacent spacer 40.

The elements within the valve body 101 are shown in Figure 3. This valve body has formed therein a chamber 105 communicating with the adjacent end of the duct 99. A second chamber 106 in the valve body 101 communicates through an outlet 107 with the pipe 102. The chambers 105 and 106 normally communicate with each other through a valve seat 108 having associated therewith a normally open valve 109. This valve is biased to open position by a spring 110 and is adapted to be closed by energization of a solenoid 111 having wires 112 and 113 connected thereto.

Referring to Figure 1, the wire 112 is grounded as at 115 while the wire 113 leads to one terminal of the vehicle battery 116. A mercury switch 118 is interposed between the other terminal of the battery 116 and the ground 119. The mercury switch 118 comprises a downwardly and rearwardly inclined tube 120 having contacts 121 and 122 respectively connected to the second terminal of the battery 116 and to the ground 119 by wires 123 and 124. The tube 120 is pivotally supported at one end as at 125. The other end of the tube is urged upwardly by a spring 126 and an adjusting screw 127 may be turned to adjust the angle of inclination of the tube 120. A body of mercury 128 is arranged in the lower end of the tube 120.

Referring to Figure 3, the valve body 101 has a third chamber 132 formed therein and communicating with the outlet 107 through a port 133. The chambers 105 and 132 are divided by a wall 136, and communication between these two chambers is controlled by a valve seat 137 and a valve 138 engageable with such seat. The valve 138 is substantially balanced in closed position by springs 139 and 140 arranged respectively in the chambers 132 and 105.

*Operation*

The parts normally occupy the positions shown in the drawings. Referring to Figure 2, the valve 84 is normally closed to disconnect the chamber 90 from the atmosphere, while the valve 78 is normally open to connect the chamber 90 to the source of vacuum through the nipple 76. When the brakes are to be applied, the operator will depress the pedal 67 to displace fluid from the master cylinder 66 through line 65, space 50, ports 51, space 52, and thence through ports 53 into the chamber 56. Thus fluid will be displaced through lines 57 into the wheel cylinders 58 to engage the brake shoes with the drums. The sealing cup 55 permits such flow of hydraulic fluid but prevents flow in the opposite direction by seating against the inner wall of the sleeve 46. The building-up of a slight pressure in the space or chamber 50 will then move the plunger 72 (Figure 2) downwardly to effect similar movement of the center of the lever 91. The spring 92 will initially maintain the valve 84 closed, and downward movement of the center of the lever 91 will close the vacuum valve 78. Further movement of the center of the lever 91 will compress the spring 92 to permit air pressure thereabove to unseat the valve 84. Air thus will flow into the control chamber 90 and through ducts 99 and 100 into the motor chamber 36. Air will also flow into the chamber 105 (Figure 3) through valve seat 108 into chamber 106, thence through outlet 107 and pipe 102 into the motor chamber 25.

It will be apparent that both motor chambers 24 and 35 are connected to the source of vacuum, these chambers communicating with each other through the jumper line 37 and the chamber 35 communicating with the chamber 73 through the duct 96. Thus vacuum will always be maintained in the chambers 24 and 35, and the admission of air into the chambers 25 and 36 will move the pistons 23 and 34 away from each other. The piston rod 26, acting as a plunger, will displace fluid from the chamber 14 into the rear wheel cylinders 16. The piston rod 48 will move the plunger 47 toward the right in Figure 1 to displace fluid from the chamber 56 into the front wheel cylinders. Thus both sets of brakes will be applied, and the force generated by the piston 34 will be assisted by pedal generated pressures in the chamber 50, the pressure in such chamber reacting through line 65 against the master cylinder plunger (not shown) to provide the pedal 67 with direct hydraulic feel.

Assuming that substantial force is applied to the brake pedal, a relatively heavy brake application will occur by relatively wide opening of the air valve 84 (Figure 2) and by the application of substantial pedal generated forces against the left-hand end of the plunger 47 (Figure 1). If the rate of deceleration of the vehicle is sufficient for such purpose, the body of mercury 128 (Figure 1) will move forwardly in the tube 120, bridging across the contacts 121 and 122 to close the circuit through the solenoid 111. The valve 109 (Figure 3) thereupon will be closed to prevent the flow of additional air from the chamber 105 to the chamber 106. The piston 23 of the rear brake motor unit will then be subjected to no further increase in pressure. The point at which this operation becomes effective can be adjusted by adjusting the angle of inclination of the tube 120. The apparatus thus operates to prevent the locking and sliding of the rear wheels with the consequent loss of traction and braking effort and the wearing of the rear tires. It is this fact which provides for a higher rate of vehicle deceleration than heretofore has been obtained. Down to this point, the apparatus operates in accordance with the disclosure of the copending application Serial No. 827,193, referred to above.

When the brake pedal 67 is released, pressure in the space or chamber 50 drops, thus relieving the upper end of the plunger 72 (Figure 2) from hydraulic pressure. The springs 92 and 94 will then return the lever 91 to normal position, the air valve 84 being closed and the vacuum valve 78 opened. The chamber 90 thus will be connected to the source of vacuum to evacuate air from the duct 99. This will evacuate air from the motor chamber 36, and the springs 39 and 59 will return the front brake applying elements to their normal positions shown in Figure 1.

The releasing of the brake pedal, of course, stops deceleration of the vehicle, whereupon the mercury 128 (Figure 1) will break the circuit for the solenoid 111 and the spring 110 (Figure 3) will open the valve 109. Air thus will be exhausted from the rear motor chamber 25, and the spring 38 will return the piston 23 to its normal position and release the rear wheel brakes.

In practice it has been found that when vehicle deceleration takes place to such an extent as to operate the mercury switch 118 and close the valve 109, followed by the sudden complete releasing of the brake pedal, there is a minor sluggishness in the breaking of the circuit across the contacts 121 and 122 and the subsequent operation dependent thereon, namely, the opening of the valve 109 by the spring 110. With the structure of copending application Serial No. 827,193, therefore, air momentarily will be trapped in the chamber 25 to prevent an instantaneous releasing of the rear brakes by return movement of the piston 23 upon releasing of the brake pedal. The present invention eliminates such sluggishness in the releasing of the rear brakes.

The valve 138 (Figure 3) may be normally open and the spring 140 eliminated, in which case some conventional means such as an upper valve stem would limit opening movement of the valve 138. Under such conditions, the valve 138 would be normally open, and the admission of air into the chamber 105 upon operation of the valve mechanism would promptly close the valve 138. The spring 140 may be employed not only to serve to limit opening movement of the valve 138 but also substantially to balance the spring 139 so that the valve 138 tends to remain approximately seated. The use of the spring 140 is preferred to eliminate any possibility that a rise in pressure in the chamber 105 incident to a brake application would fail to close the valve 138.

Upon the releasing of the brake pedal after a brake application and the returning of the parts of the valve mechanism to the normal positions shown in Figure 2, there will be an immediate drop in pressure in the chamber 105, with higher pressure present in the motor chamber 25, pipe 102 and chambers 106 and 132. The differential pressure thus occurring on opposite sides of the valve 138 instantly upon the releasing of the brake pedal will result in the opening of this valve, thus permitting a rapid drop in pressure in the lines leading to the motor chamber 25 and in such motor chamber. This drop in pressure occurs more rapidly than can be accomplished without the use of the valve 138 since a minor time interval occurs, after vehicle deceleration has stopped, before the mercury 128 will open the contact across contacts 121 and 122, and de-energize the solenoid 111, and the spring 110 opens the valve 109. Sluggishness in the releasing of the rear wheel brakes accordingly is completely eliminated, which of course is highly desirable. The valve 138 thus constitutes means operable independently of the inertia-controlled valve 109 for dropping the pressure in the motor chamber 25. In other words, the valve 138 provides means for bypassing the valve 109 under one condition of operation, namely, when pressure is higher in the chamber 132 and consequently in the motor chamber 25 than in the chamber 105 and the control chamber 90.

Whereas it has been the common practice for many years to provide a 60–40 braking ratio between the front and rear wheels of a passenger car, the present construction renders it wholly feasible to provide a 50–50 ratio. Such ratio is wholly practicable under ordinary braking conditions and equalizes brake and tire wear and minimizes the dipping of the front end of the vehicle when the brakes are applied. With the present system, the application of the front wheel brakes is not limited by the power of the piston 34 since after the front motor unit has been energized to its maximum extent, the application of further pressure against the pedal 67 will increase pressure in the chamber 56 and, accordingly, in the front wheel cylinders. A higher braking ratio for the front wheels thus will be provided when needed. This additional force generated by the operator cannot be applied to the rear wheel cylinders, the pressure in which is dependent solely upon pressure in the chamber 25. Moreover, on ordinary surfaces, it is impossible to lock the rear wheel cylinders during heavy brake application. This condition is taken care of by the inertia-controlled valve 109 which limits energization of the rear booster motor unit. The valve 138 cooperates with the inertia-controlled valve by providing for operation of the latter for its intended purpose while eliminating the necessity for depending upon the opening of the valve 109 for releasing the rear wheel brakes. This occurs automatically whenever pressure in the chamber 132 exceeds pressure in the chamber 105. The present invention therefore provides all of the advantages of the structure of copending application Serial No. 827,193, referred to above, while eliminating the disadvantage of the latter construction, namely, the sluggish releasing under some conditions of the rear wheel brakes.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism for a motor vehicle having a plurality of sets of wheel cylinders, a pair of fluid pressure motor units each having a pressure responsive unit providing therewith a variable pressure chamber, fluid displacing devices connected to be operated by said pressure responsive unit, one such device being connected to one set of wheel cylinders and the other being connected to the remaining wheel cylinders, a control valve mechanism having fluid connection with high and low pressure sources, ducts connecting said valve mechanism to said variable pressure chambers, said valve mechanism being normally conditioned to connect said variable pressure chambers through said ducts to said low pressure source, an inertia-controlled valve connected in the duct for the variable pressure chamber of one motor and arranged to prevent admission of fluid from said high pressure source into said variable pressure chamber when the rate of vehicle deceleration has increased to a predetermined point, and an auxiliary valve arranged to connect said last-named variable pressure chamber to said valve mechanism independently of said inertia-controlled valve when the normal condition of said valve mechanism is restored.

2. A booster brake mechanism for a motor vehicle having a plurality of sets of wheel cylinders, a pair of fluid pressure motor units each having a pressure responsive unit providing therewith a variable pressure chamber, fluid displacing devices connected to be operated by said pressure responsive unit, one such device being connected to one set of wheel cylinders and the other being connected to the remaining wheel cylinders, a control valve mechanism having fluid connection with high and low pressure sources, ducts connecting said valve mechanism to said variable pressure chambers, said valve mechanism being normally conditioned to connect said variable pressure chambers through said ducts to said low pressure source, an inertia-controlled valve connected in the duct for the variable pressure chamber of one motor and arranged to prevent admission of fluid from said high pressure source into said variable pressure chamber when the rate of vehicle deceleration has increased to a predetermined point, a bypass duct connected around said inertia-controlled valve, and a check valve in said bypass duct opening toward said valve mechanism.

3. A booster brake mechanism for a motor vehicle having a plurality of sets of wheel cylinders, a first hydraulic chamber, having a first plunger therein, connected to at least one set of said wheel cylinders, a second hydraulic chamber, having a second plunger therein, connected to the remaining wheel cylinders, a pair of fluid pressure motors each having a pressure responsive unit providing therewith a variable pressure chamber, one of said units being connected to said first plunger and the other of said units being connected to said second plunger, a control valve mechanism having fluid connection with high and low pressure sources, duct means connecting said valve mechanism to said variable pressure chambers, said valve mechanism being normally conditioned to connect both variable pressure chambers to said low pressure source and being operative for disconnecting such chambers from such source and connecting them to said high pressure source, pedal operable means connected to operate said valve mechanism and to supply hydraulic fluid back of said first plunger to assist the associated pressure responsive unit in operating such plunger, inertia-controlled means in said duct means connected to be responsive to a predetermined rate of vehicle deceleration for disconnecting from said valve mechanism the variable pressure chamber of the motor connected to said second plunger, and auxiliary means in said duct means for connecting said last-mentioned variable pressure chamber to said valve mechanism independently of said inertia-controlled means when the normal condition of said valve mechanism is restored and said inertia-controlled means is still operative.

4. A mechanism according to claim 3 wherein said auxiliary means comprises a bypass duct connected around said inertia-controlled means, and a check valve in said bypass duct opening toward said valve mechanism.

5. A mechanism according to claim 3 wherein said duct means comprises branch ducts opening into said variable pressure chambers, said inertia-controlled means comprising a normally open valve arranged in the branch duct leading to said last-mentioned variable pressure chamber, and an inertia-controlled device for closing such valve when the rate of vehicle deceleration exceeds said predetermined rate, said auxiliary means comprising a check valve bypassing said last-named valve and opening toward said valve mechanism.

6. A mechanism according to claim 3 wherein said inertia-controlled means comprises a valve biased to open position, a solenoid connected thereto, and a circuit for said solenoid including an inertia-controlled switch for closing said circuit when the rate of vehicle deceleration exceeds said predetermined rate, said auxiliary means comprising a check valve bypassing said last-named valve and opening toward said valve mechanism, and springs acting oppositely against said check valve and substantially balancing each other when said check valve is in closed position.

7. A booster mechanism for a motor vehicle having a plurality of sets of wheel cylinders, comprising a pair of fluid pressure motor units each having a pressure responsive unit providing therewith a variable pressure chamber, fluid displacing devices respectively connected to said pressure responsive units, one such device being connected to one set of wheel cylinders and the other being connected to the remaining wheel cylinders, a control valve mechanism having fluid connection with high and low pressure sources, a duct connected between said valve mechanism and each of said variable pressure chambers, said valve mechanism being normally conditioned to connect said variable pressure chambers through said ducts to said low pressure source, a valve housing in one of said ducts having a first chamber communicating with the associated variable pressure chamber, a second chamber communicating with said valve mechanism, and a third chamber communicating with said associated variable pressure chamber, a valve between said first and second chambers biased to open position to normally provide free communication between said associated variable pressure chamber and said valve mechanism, means connected to be responsive to the rate of vehicle deceleration for closing said valve when said rate exceeds a predetermined point, and a normally closed check valve between said second and third chambers opening into said second chamber.

References Cited in the file of this patent
UNITED STATES PATENTS

| | | |
|---|---|---|
| 2,136,579 | Campbell | Nov. 15, 1938 |
| 2,148,752 | Hewitt | Feb. 28, 1939 |
| 2,242,297 | Freeman | May 20, 1941 |
| 2,402,344 | Price | June 18, 1946 |
| 2,431,445 | Anderson | Nov. 25, 1947 |
| 2,747,697 | Banker | May 29, 1956 |
| 2,753,017 | Curl et al. | July 3, 1956 |